(12) United States Patent
Mizuno et al.

(10) Patent No.: US 8,254,688 B2
(45) Date of Patent: Aug. 28, 2012

(54) IMAGING SYSTEM AND IMAGING METHOD

(75) Inventors: Seiichiro Mizuno, Hamamatsu (JP);
Yukinobu Sugiyama, Hamamatsu (JP)

(73) Assignee: Hamamatsu Photonics K.K.,
Hamamatsu-shi, Shizuoka (JP)

( * ) Notice: Subject to any disclaimer, the term of this patent is extended or adjusted under 35 U.S.C. 154(b) by 1146 days.

(21) Appl. No.: 11/596,070

(22) PCT Filed: May 2, 2005

(86) PCT No.: PCT/JP2005/008304
§ 371 (c)(1),
(2), (4) Date: May 9, 2008

(87) PCT Pub. No.: WO2005/109863
PCT Pub. Date: Nov. 17, 2005

(65) Prior Publication Data
US 2008/0253616 A1    Oct. 16, 2008

(30) Foreign Application Priority Data

May 10, 2004   (JP) ............................. P2004-140057

(51) Int. Cl.
*G06K 9/46* (2006.01)
(52) U.S. Cl. .................... 382/190; 382/100; 382/105
(58) Field of Classification Search .............. 382/100, 382/103, 105, 106, 107, 181, 190, 231, 254, 382/308
See application file for complete search history.

(56) References Cited

U.S. PATENT DOCUMENTS 7,224,826 B2 * 5/2007 Shibazaki et al. ............ 382/128
2004/0184673 A1 * 9/2004 Watanabe ..................... 382/274
2008/0240493 A1 * 10/2008 Yoda ............................. 382/100

FOREIGN PATENT DOCUMENTS

| GB | 2 217 498 | 10/1989 |
| JP | 2-226479 | 9/1990 |
| JP | 3-265999 | 11/1991 |
| JP | 5-290293 | 11/1993 |
| JP | 6-60291 | 3/1994 |

(Continued)

*Primary Examiner* — Bhavesh Mehta
*Assistant Examiner* — Edward Park
(74) *Attorney, Agent, or Firm* — Drinker Biddle & Reath LLP

(57) ABSTRACT

The present invention relates to, for example, an image pickup system having a structure capable of imaging a subject at a low power consumption and a low cost even when the subject may be dark. The image pickup system comprises an image pickup device, a peak position detecting section, a partial image acquiring section, and a partial image operating section. The image pickup device outputs image data that represents the two-dimensional intensity distribution of light incident on a photodetecting section, and outputs light intensity profile data that represents the one-dimensional intensity distribution of the incident light in each of first and second directions in the photodetecting section. The peak position detecting section detects a light intensity peak position in the two-dimensional intensity distribution of the light incident on the photodetecting section in the image pickup device, based on the light intensity profile data outputted from the image pickup device. The partial image acquiring section acquires a partial image from an entire image that can be imaged by the image pickup device so that the light intensity peak position detected by the peak position detecting section is made a specific position for the partial image in the entire image. The partial image operating section integrates the acquired partial image.

12 Claims, 9 Drawing Sheets

FOREIGN PATENT DOCUMENTS

| | | |
|---|---|---|
| JP | 7-200987 | 8/1995 |
| JP | 08-083344 | 3/1996 |
| JP | 08-166221 | 6/1996 |
| JP | 8-292998 | 11/1996 |
| JP | 11-175655 | 7/1999 |
| JP | 2001-103370 | 4/2001 |
| JP | 2003-189181 | 7/2003 |
| JP | 2005-092857 | 4/2005 |

* cited by examiner (a)

(b)

IMAGING SYSTEM AND IMAGING METHOD

TECHNICAL FIELD

The present invention relates to an image pickup system in which an image pickup device having a photodetecting section with a plurality of pixels arranged two-dimensionally therein is used and to an image pickup method.

BACKGROUND ART

In the case of trying to image a dark subject, illumination light is generally applied to the subject for imaging. The invention disclosed in Patent Document 1 is directed to an image pickup system intended to image a license plate of a moving automobile and including an illumination device to be turned on in the case that the automobile license plate as a subject is dark.

Patent Document 1: Japanese Patent Application Laid-Open No. H6-60291

DISCLOSURE OF THE INVENTION

Problem to be Solved by the Invention

The inventors have studied conventional image pickup systems in detail, and as a result, have found problems as follows. That is, the image pickup system disclosed in Patent Document 1 requires an illumination device to be provided and thereby causes an increase in power consumption, which suffers from a problem in that not only the initial cost but also the maintenance cost is increased.

In order to overcome the above-mentioned problems, it is an object of the present invention to an image pickup system having a structure capable of imaging a subject at a low power consumption and a low cost even when the subject may be dark and an image pickup method.

Means for Solving Problem

An image pickup system and an image pickup method according to the present invention each utilize an image pickup device having a photodetecting section with a plurality of pixels arranged two-dimensionally therein and outputs image data that represents the two-dimensional intensity distribution of light incident on the photodetecting section, and outputs light intensity profile data that represents the one-dimensional intensity distribution of the incident light in each of a first direction and a second direction different from the first direction in the photodetecting section.

In particular, the image pickup system according to the present invention comprises an image pickup device having such a structure as mentioned above, a peak position detecting section, a partial image acquiring section, and a partial image operating section. The peak position detecting section acquires the light intensity profile data in the respective first and second directions outputted from the image pickup device, and detects a light intensity peak position in the two-dimensional intensity distribution of the light incident on the photodetecting section in the image pickup device, based on the acquired light intensity profile data. The partial image acquiring section acquires a partial image from an entire image that can be imaged by the image pickup device so that the light intensity peak position detected by the peak position detecting section is made a specific position for the partial image in the entire image. Then, the partial image operating section integrates the partial image acquired by the partial image acquiring section.

Also, the image pickup method according to the present invention utilizes an image pickup device having such a structure as described above and comprises a peak position detecting step, a partial image acquiring step, and a partial image operating step. The peak position detecting step acquires the light intensity profile data in the respective first and second directions outputted from the image pickup device, and detects a light intensity peak position in the two-dimensional intensity distribution of the light incident on the photodetecting section in the image pickup device, based on the acquired light intensity profile data. The partial image acquiring step acquires a partial image from an entire image that can be imaged by the image pickup device so that the light intensity peak position detected in the peak position detecting step is made a specific position for the partial image in the entire image. Then, the partial image operating step integrates the partial image acquired in the partial image acquiring step.

Since the peak position detecting section (or peak position detecting step) and partial image acquiring section (or partial image acquiring step) thus specify a partial image including a subject, and then the partial image operating section (or partial image operating step) thus integrates the partial image, the subject can be imaged. Therefore, in accordance with the image pickup system and image pickup method according to the present invention, no illumination device is required even when the subject may be dark, which allows the subject to be imaged at a low power consumption as well as a low cost.

In the image pickup system according to the present invention, the peak position detecting section preferably detects a plurality of light intensity peak positions in the two-dimensional intensity distribution of the light incident on the photodetecting section in the image pickup device, while the partial image operating section preferably magnifies or demagnifies the partial image so that the distance between the plurality of light intensity peak positions is made constant, and integrates the magnified or demagnified partial image. Also, in the image pickup method according to the present invention, the peak position detecting step preferably detects a plurality of light intensity peak positions in the two-dimensional intensity distribution of the light incident on the photodetecting section in the image pickup device, while the partial image operating step preferably magnifies or demagnifies the partial image so that the distance between the plurality of light intensity peak positions is made constant, and integrates the magnified or demagnified partial image. In this case, even when, for example, a subject may gradually come close to or move away from the image pickup device, integrating a magnified or demagnified partial image allows the subject to be imaged.

In the image pickup system according to the present invention, the peak position detecting section may detects a plurality of light intensity peak positions in the two-dimensional intensity distribution of the light incident on the photodetecting section in the image pickup device, while the partial image operating section may rotates the partial image so that the direction of straight lines connecting the plurality of light intensity peak positions with each other is made constant, and integrates the rotated partial image. Also, in the image pickup method according to the present invention, the peak position detecting step may detects a plurality of light intensity peak positions in the two-dimensional intensity distribution of the light incident on the photodetecting section in the image pickup device, while the partial image operating step may rotates the partial image so that the direction of straight lines connecting the plurality of light intensity peak positions with each other is made constant and integrates the rotated partial image. In this case, even when, for example, a subject may be rotated in a target image, rotating and integrating a partial image allows the subject to be imaged easily.

In the image pickup system according to the present invention, when acquiring the partial image, the partial image acquiring section preferably extracts only image data corresponding to the partial image among the image data read out from the image pickup device. Also, in the image pickup method according to the present invention, when acquiring the partial image, the partial image acquiring step preferably extracts only image data corresponding to the partial image among the image data read out from the image pickup device.

In the image pickup system according to the present invention, when acquiring the partial image, the partial image acquiring section may reads out only image data corresponding to the partial image from the image pickup device. Also, in the image pickup method according to the present invention, when acquiring the partial image, the partial image acquiring step may reads out only image data corresponding to the partial image from the image pickup device.

Further, in the image pickup system according to the present invention, the time period during which the partial image acquiring section acquires the partial image from the image pickup device and the time period during which the peak position detecting section acquires the light intensity profile data from the image pickup device are preferably overlapped at least partially with each other. Also, in the image pickup method according to the present invention, the time period for acquiring the partial image from the image pickup device in the partial image acquiring step and the time period for acquiring the light intensity profile data from the image pickup device in the peak position detecting step are preferably overlapped at least partially with each other.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

Effect of the Invention

In accordance with the present invention, it is possible to image-pickup a subject at a low power consumption and a low cost even when the subject may be dark.

Figure 1:
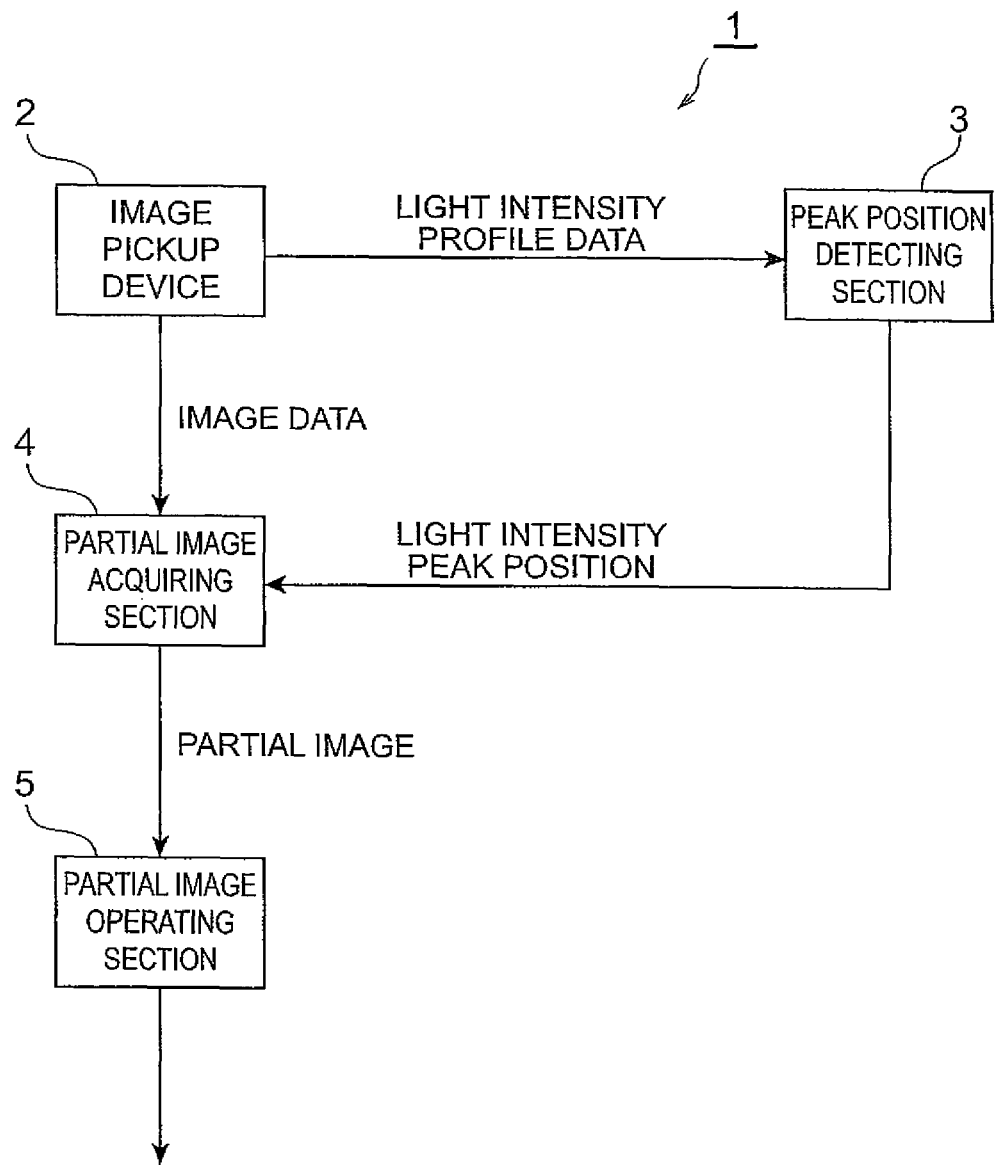
FIG. 1 is a view showing the schematic configuration of an image pickup system of a first embodiment according to the present invention.

DESCRIPTION OF THE REFERENCE NUMERALS 1, 1A . . . image pickup systems; 2, 2A . . . image pickup devices; 3 . . . peak position detecting section; 4, 4A . . . partial image acquiring sections; and 5 . . . partial image operating section.

BEST MODES FOR CARRYING OUT THE INVENTION

In the following, embodiments of an image pickup system and image pickup method according to the present invention will be explained in detail with reference to FIGS. 1 to 9. In the explanation of the drawings, constituents identical to each other will be referred to with numerals identical to each other without repeating their overlapping descriptions.

First Embodiment

Firstly, an image pickup system and an image pickup method a first embodiment according to the present invention will be explained. FIG. 1 is a view showing the schematic configuration of the image pickup system of the first embodiment according to the present invention. The image pickup system 1 shown in FIG. 1 comprises an image pickup device 2, a peak position detecting section 3, a partial image acquiring section 4, and a partial image operating section 5. The image pickup device 2 has a photodetecting section with a plurality of pixels arranged two-dimensionally therein and outputs image data representing the two-dimensional intensity distribution of light incident on the photodetecting section. The image pickup device 2 also outputs light intensity profile data representing the one-dimensional intensity distribution of the incident light in each of a first direction and a second direction perpendicular to the first direction in the photodetecting section.

The peak position detecting section 3 acquires the light intensity profile data in the respective first and second directions outputted from the image pickup device 2. Then, the peak position detecting section 3 detects a light intensity peak position in the two-dimensional intensity distribution of the light incident on the photodetecting section in the image pickup device 2, based on the acquired light intensity profile data. The partial image acquiring section 4 acquires a partial image from an entire image that can be imaged by the image pickup device 2 so that the light intensity peak position detected by the peak position detecting section 3 is made a specific position for the partial image in the entire image. In particular, in the present first embodiment, when acquiring the partial image, the partial image acquiring section 4 extracts only image data corresponding to the partial image among the image data read out from the image pickup device 2. Also, the partial image operating section 5 integrates the partial image acquired by the partial image acquiring section 4. It is noted that the peak position detecting section 3, partial image acquiring section 4, and partial image operating section 5 can be achieved by an apparatus (e.g. computer) including a control section and a memory section, and the like.

The peak position detecting section 3 is preferably adapted to detect a plurality of light intensity peak positions in the two-dimensional intensity distribution of the light incident on the photodetecting section in the image pickup device 2. In this case, the partial image operating section 5 preferably magnifies or demagnifies the partial image so that the distance between the plurality of light intensity peak positions is made constant and integrates the magnified or demagnified partial image. Also, the partial image operating section 5 may rotates the partial image so that the direction of straight lines connecting the plurality of light intensity peak positions with each other is made constant and integrates the rotated partial image.

Figure 2:
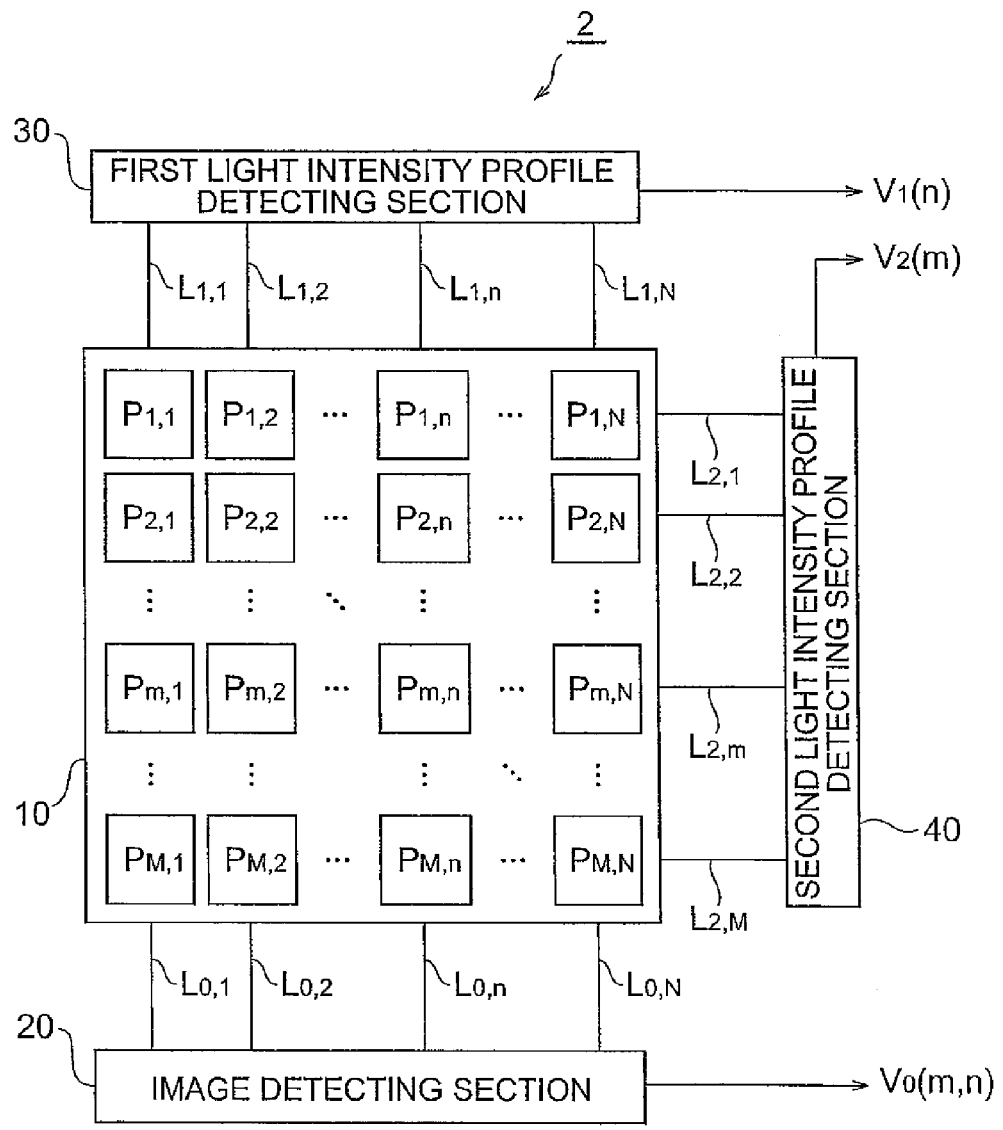
FIG. 2 is a view showing the schematic configuration of an image pickup device.

FIG. 2 is a view showing the schematic configuration of an image pickup device 2 applicable to the image pickup system 1 according to the first embodiment. As shown in FIG. 2, the image pickup device 2 comprises a photodetecting section 10, an image detecting section 20, a first light intensity profile detecting section 30, and a second light intensity profile detecting section 40. The photodetecting section 10 has M×N pixels $P_{1,1}$ to $P_{M,N}$ that are arranged two-dimensionally, where the pixel $P_{m,n}$ is positioned at the m-th row and the n-th column. Also, M and N each represent an integer of 2 or more; "m" represents any integer of 1 or more but M or less, and "n" represents any integer of 1 or more but N or less. Each pixel $P_{m,n}$ has a common composition.

The image detecting section 20 is connected with the photodetecting section 10 via wirings $L_{0,1}$ to $L_{0,N}$ and outputs image data $V_0(m,n)$ representing the two-dimensional intensity distribution of light incident on the photodetecting section 10. The first light intensity profile detecting section 30 is connected with the photodetecting section 10 via wirings $L_{1,1}$ to $L_{1,N}$ and outputs first light intensity profile data $V_1(n)$ representing the one-dimensional intensity distribution of the incident light in a first direction in the photodetecting section 10. Also, the second light intensity profile detecting section 40 is connected with the photodetecting section 10 via wirings $L_{2,1}$ to $L_{2,M}$ and outputs second light intensity profile data $V_2(m)$ representing the one-dimensional intensity distribution of the incident light in a second direction in the photodetecting section 10.

Figure 3:
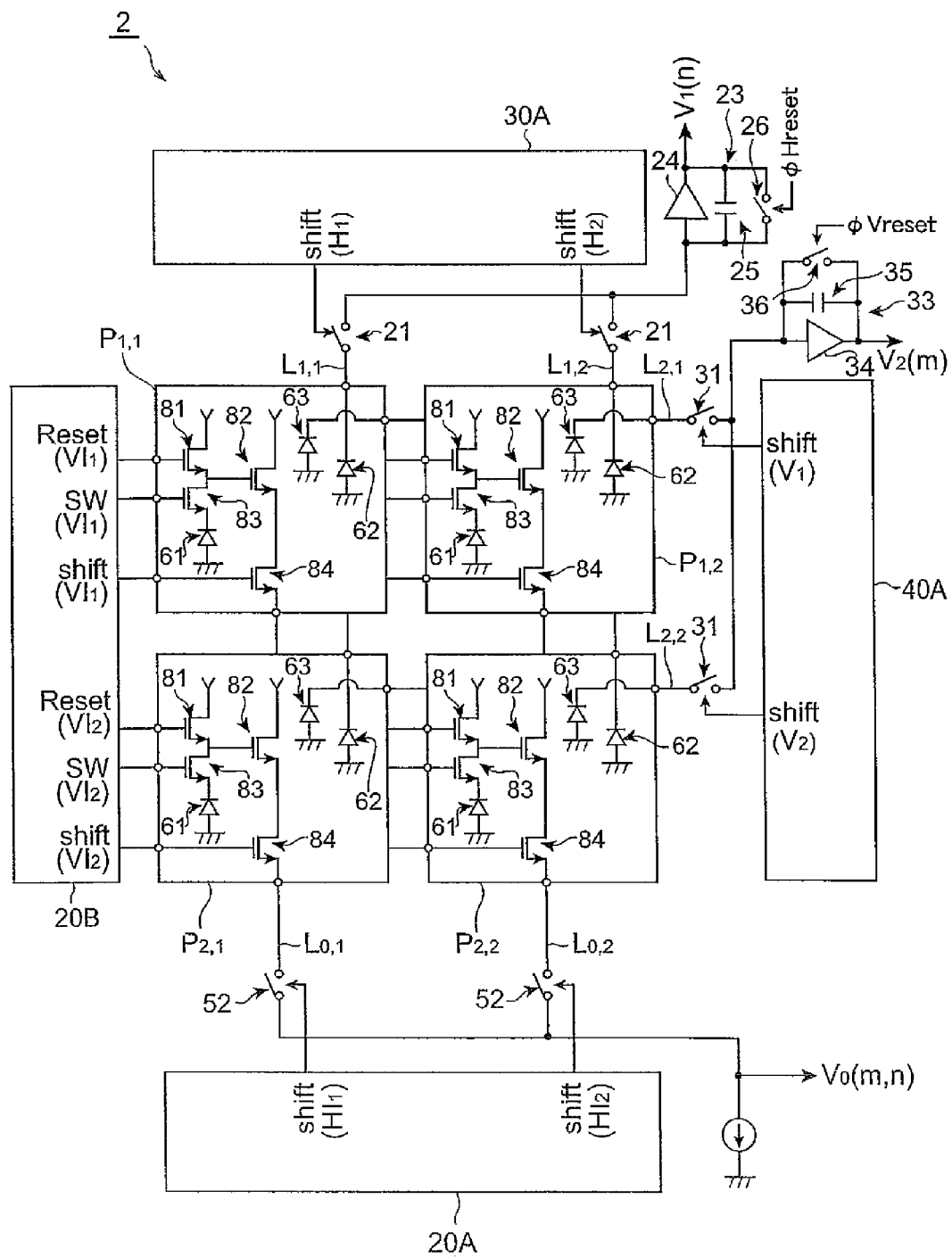
FIG. 3 is a circuit diagram of pixels $P_{m,n}$ included in the photodetecting section of the image pickup device.

FIG. 3 is a circuit diagram of pixels $P_{m,n}$ included in the photodetecting section 10 of the image pickup device 2. It is noted that in FIG. 3, only four pixels $P_{1,1}$, $P_{1,2}$, $P_{2,1}$, and $P_{2,2}$ are shown for simplification. In this figure, wirings extending from the same positions in the pixels $P_{1,1}$, $P_{1,2}$, $P_{2,1}$, and $P_{2,2}$ are connected with each other. Each of the pixels $P_{1,1}$, $P_{1,2}$, $P_{2,1}$, and $P_{2,2}$ includes three photodiodes 61 to 63. The photosensitive areas of the photodiodes 62 and 63 have an approximately triangular shape, while the entire area including the photosensitive areas of the photodiodes 62 and 63 has an approximately rectangular shape and the entire area including the photosensitive areas of the photodiodes 61 to 63 also has an approximately rectangular shape.

In order to output first light intensity profile data $V_1(n)$ representing the one-dimensional intensity distribution of incident light in the first direction in the photodetecting section 10, the photodiode 62 in each pixel is connected to an amplifier 24 via a switch 21 that opens and closes based on a signal "shift $(H_n)$" to be outputted from a shift register 30A. The amplifier 24, capacitive element 25, and switch 26 constitute an integrating circuit accumulating input charges in the capacitive element 25 and outputting a voltage value corresponding to the amount of accumulated charge. The shift register 30A, amplifier 24, capacitive element 25, and switch 26 constitute the first light intensity profile detecting section 30 in FIG. 2.

In order to output second light intensity profile data $V_2(m)$ representing the one-dimensional intensity distribution of incident light in the second direction in the photodetecting section 10, the photodiode 63 in each pixel is connected to an amplifier 34 via a switch 31 that opens and closes based on a signal "shift $(V_m)$" to be outputted from a shift register 40A. The amplifier 34, capacitive element 35, and switch 36 constitute an integrating circuit accumulating input charges in the capacitive element 35 and outputting a voltage value corresponding to the amount of accumulated charge. The shift register 40A, amplifier 34, capacitive element 35, and switch 36 constitute the second light intensity profile detecting section 40 in FIG. 2.

The photodiode 61 in each pixel outputs image data $V_0(m,n)$ representing the two-dimensional intensity distribution of light incident on the photodetecting section 10. The photodiode 61 and four field effect transistors 81 to 84 constitute an active pixel sensor (APS). The drains of the transistors 81 and 82 are connected to a power supply voltage, and the source of the transistor 81 and the gate of the transistor 82 are connected to the drain of the transistor 83. The source of the transistor 83 is connected to the cathode of the photodiode 61. Further, the source of the transistor 82 is connected to a switch 52 through the drain and source of the transistor 84. The gate of the transistor 81 is provided with a reset signal "Reset $(VI_m)$" from a shift register 20B, while the gate of the transistor 83 is provided with a signal "SW $(VI_m)$" from the shift register 20B. Also, the gate of the transistor 84 is provided with a signal "shift $(VI_m)$" from the shift register 20B. The switch 52 opens and closes based on a signal "shift $(HI_n)$" to be outputted from a shift register 20A. It is noted that the shift registers 20A and 20B constitute the image detecting section 20 in FIG. 2.

The operation of the active pixel sensor will be explained. Firstly, a reset signal "Reset $(VI_m)$" is applied to the gate of the transistor 81 to turn the transistor 81 on, and thereby to cause the cathode potential of lie photodiode 61 to be the power supply voltage (reset) via the drain and source of the transistor 81. It is here noted that the transistor 83 is on while the transistor 84 is off. Subsequently, the reset signal "Reset $(VI_m)$" to the gate of the transistor 81 disappears to turn the transistor 81 off. In this case, the transistor 83 is also turned off. This allows the cathode potential of the photodiode 61 to be held at the power supply voltage. When the photodiode 61 is exposed to light in this state, the photodiode 61 converts incident light into an electrical signal and electric charge Q proportional to the amount of applied light (intensity×time) will be accumulated in the photodiode 61. In this case, the cathode potential of the photodiode 61 undergoes a voltage change of Q/C (where C represents the capacitance of the photodiode 61). Then, when a signal "SW $(VI_m)$" is applied to the gate of the transistor 83 and a signal "shift $(VI_m)$" is applied to the gate of the transistor 84, the foregoing change in the cathode potential in the photodiode 61 is outputted as an image signal through the transistors 83, 82, and 84.

Figure 4:
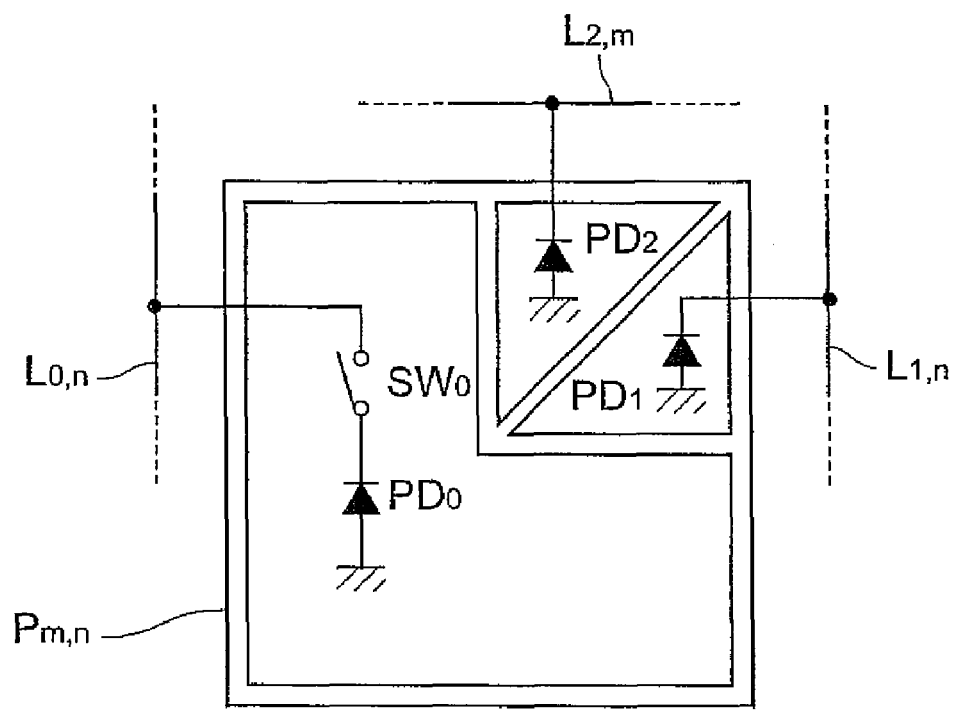
FIG. 4 is another circuit diagram of each pixel $P_{m,n}$ included in the photodetecting section of the image pickup device.

FIG. 4 is another circuit diagram of each pixel $P_{m,n}$ included in the photodetecting section 10 of the image pickup device 2. The pixel $P_{m,n}$ shown in FIG. 4 has three photodiodes $PD_0$ to $PD_2$ and a switch $SW_0$. Each of the photosensitive areas of the photodiodes $PD_1$ and $PD_2$ has an approximately triangular shape, while the entire area including the photosensitive areas of the photodiodes $PD_1$ and $PD_2$ has an approximately rectangular shape and the entire area including the photosensitive areas of the photodiodes $PD_0$ to $PD_2$ also has an approximately rectangular shape. The photodiodes 61, 62, and 63 in FIG. 2 correspond, respectively, to the photodiodes $PD_0$, $PD_1$, and $PD_2$.

The photodiodes $PD_0$ included in the respective M pixels $P_{1,n}$ to $P_{M,n}$ the n-th column are connected commonly to the wiring $L_{0,n}$ via the switch $SW_0$ in each pixel. The switches $SW_0$ included in the pixels $P_{m,n}$ open and close at the same timing in each row, while being closed sequentially between different rows. The photodiodes $PD_1$ included in the respective M pixels $P_{1,n}$ to $P_{M,n}$ in the n-th column are connected commonly to the wiring $L_{1,n}$. Also, the photodiodes $PD_2$ included in the respective N pixels $P_{m,1}$ to $P_{m,N}$ in the m-th row are connected commonly to the wiring $L_{2,m}$. Then, each of the wirings $L_{0,n}$, $L_{1,n}$, and $L_{2,m}$ is connected with an integrating circuit via a switch, the circuit accumulating electric charges in a capacitive element and outputting a voltage value corresponding to the amount of accumulated charge.

The voltage value $V_1(n)$ to be outputted from the first light intensity profile detecting section 30 represents the total amount of light incident on the photodiodes $PD_1$ included in the respective M pixels $P_{1,n}$ to $P_{M,n}$ the n-th column that are connected commonly to the wiring $L_{1,n}$. That is, the voltage value $V_1(n)$ is first light intensity profile data representing the one-dimensional intensity distribution of incident light in the first direction in the photodetecting section 10.

The voltage value $V_2(m)$ to be outputted from the second light intensity profile detecting section 40 represents the total amount of light incident on the photodiodes $PD_2$ included in the respective N pixels $P_{m,1}$ to $P_{m,N}$ in the m-th row that are connected commonly to the wiring $L_{2,m}$. That is, the voltage value $V_2(m)$ is second light intensity profile data representing the one-dimensional intensity distribution of incident light in the second direction in the photodetecting section 10

Figure 5:
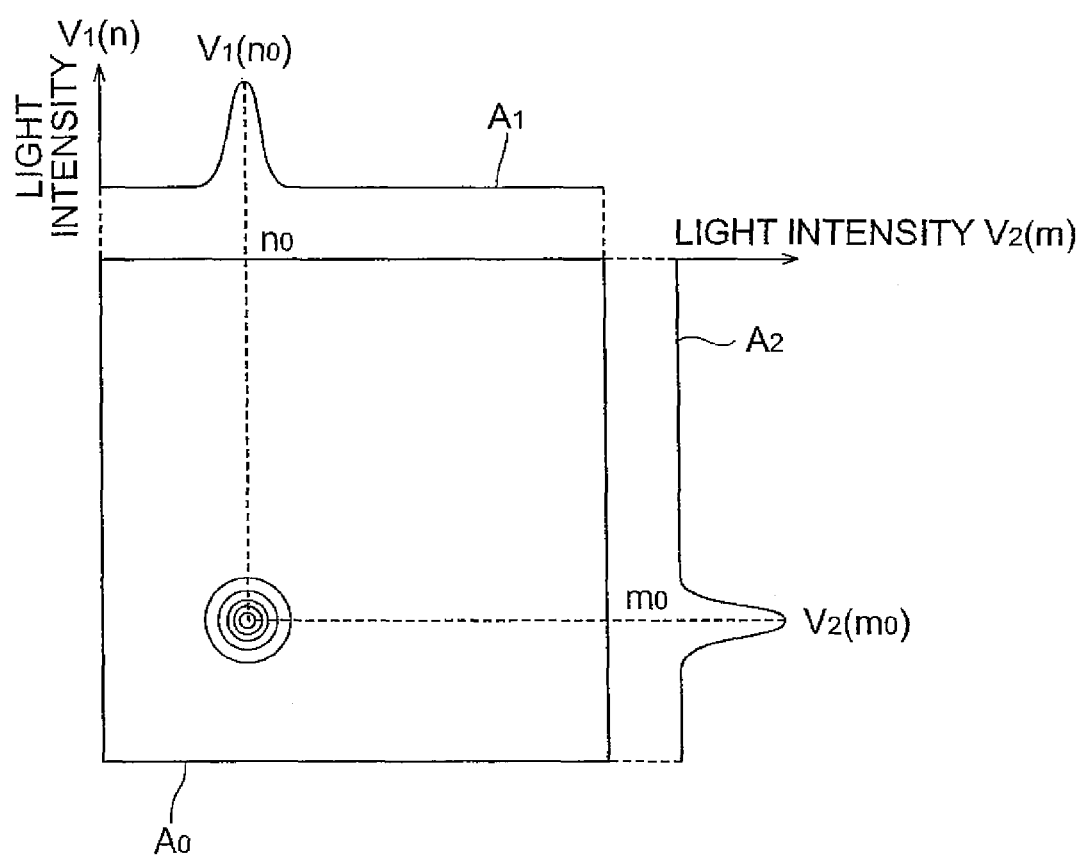
FIG. 5 is a view for explaining image data $V_0(m,n)$, first light intensity profile data $V_1(n)$, and second light intensity profile data $V_2(m)$ outputted from the image pickup device.

FIG. 5 is a view for explaining image data $V_0(m,n)$, first light intensity profile data $V_1(n)$, and second light intensity profile data $V_2(m)$ outputted from the image pickup device 2. The image data $V_0(m,n)$ outputted from the image detecting section 20 in the image pickup device 2 represents the two-dimensional intensity distribution of light incident on the photodetecting section 10 (i.e. an image $A_0$ obtained by image pickup). The first light intensity profile data $V_1(n)$ outputted from the first light intensity profile detecting section 30 in the image pickup device 2 represents the one-dimensional intensity distribution $A_1$ of incident light in the first direction in the photodetecting section 10. Also, the second light intensity profile data $V_2(m)$ outputted from the second light intensity profile detecting section 40 in the image pickup device 2 represents the one-dimensional intensity distribution $A_2$ of incident light in the second direction in the photodetecting section 10.

For example, as shown in FIG. 5, it is assumed that there is an object having a light intensity peak at a position $(m_0, n_0)$ in the image $A_0$ represented by the image data $V_0(m,n)$, and that the light intensity decreases with an increase in the distance from the position. In this case, the light intensity $V_1(n_0)$ at the position no becomes a peak value in the intensity distribution $A_1$ of incident light in the first direction represented by the first light intensity profile data $V_1(n)$. Also, the light intensity $V_2(m_0)$ at the position $m_0$ becomes a peak value in the intensity distribution $A_2$ of incident light in the second direction represented by the second light intensity profile data $V_2(m)$.

It is noted that the light intensity peak position $(m_0, n_0)$ in the image $A_0$ is preferably obtained from the first and second light intensity profile data $V_1(n)$ and $V_2(m)$ each having a small amount of data, though it may also be obtained from the image data $V_0(m,n)$. In accordance with the image pickup system 1 and image pickup method according to the first embodiment, it is possible to image-pickup a subject, even when the subject may be dark, by performing required processing based on the image data $V_0(m,n)$, first light intensity profile data $V_1(n)$, and second light intensity profile data $V_2(m)$ outputted from the thus arranged image pickup device 2.

Figure 6:
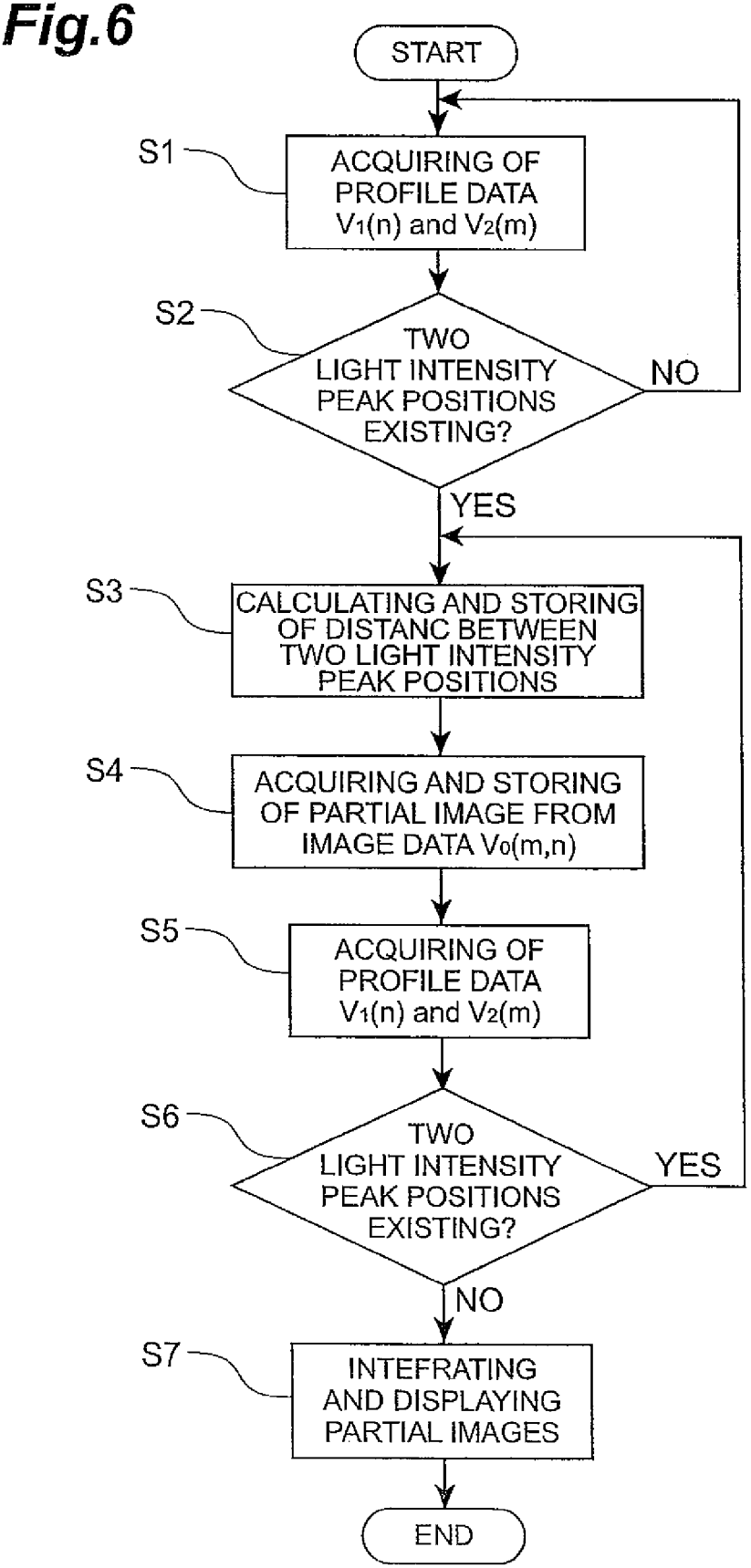
FIG. 6 is a flow chart for explaining the operation of the image pickup system according to the first embodiment.
Figure 7:
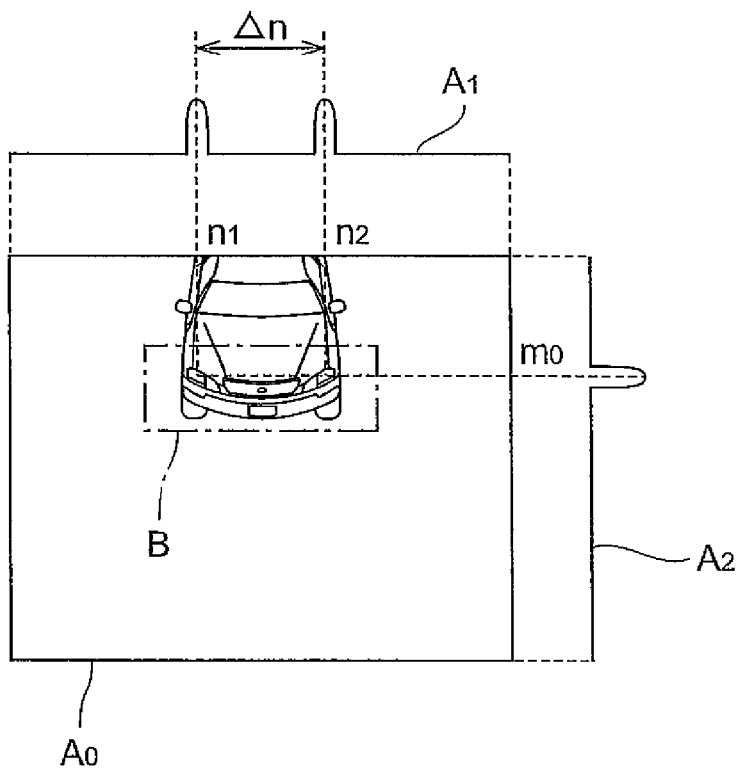
FIG. 7 is a view showing examples of images $A_0$ and the intensity distributions $A_1$ and $A_2$ of incident light obtained by the image pickup system according to the first embodiment.
Figure 7:
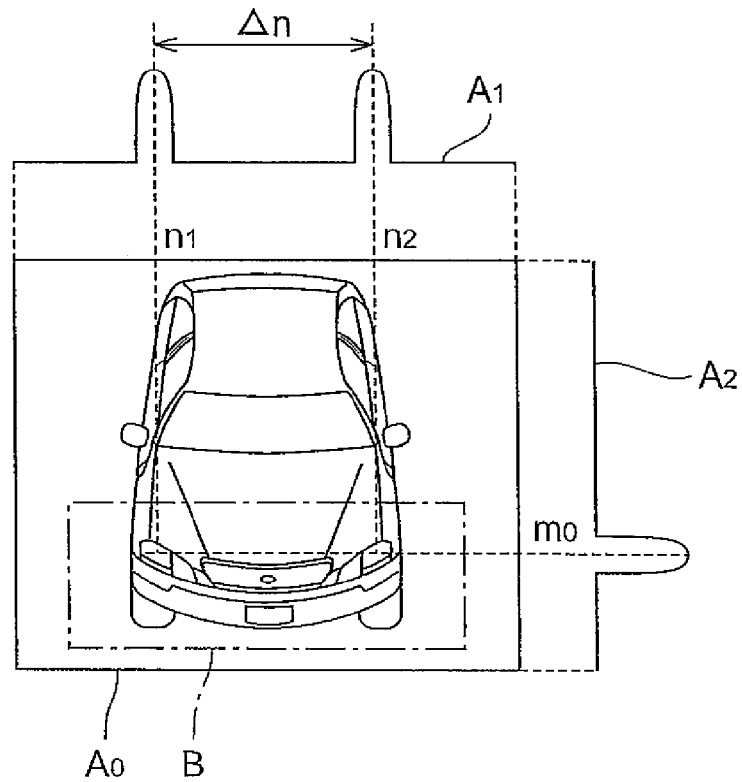

Next, the operation of the image pickup system 1 and the image pickup method according to the first embodiment will be explained. FIG. 6 is a flow chart for explaining the operation of the image pickup system 1 according to the first embodiment. Also, FIG. 7 is a view showing examples of images $A_0$ and the intensity distributions $A_1$ and $A_2$ of incident light obtained by the image pickup system 1 according to the first embodiment. It is noted that the case of imaging a license plate of an automobile moving at night will hereinafter be explained. In this case, the image pickup device 2 is arranged above a driving lane so as to be capable of imaging the front surface of the automobile (the area including at least the headlights and license plate) that moves on the driving lane with the headlights on and approaches gradually (refer to FIG. 7).

In step S1, the peak position detecting section 3 instructs the image pickup device 2 to output first and second light intensity profile data $V_1(n)$ and $V_2(m)$. Then, the first and second light intensity profile data $V_1(n)$ and $V_2(m)$ outputted from the image pickup device 2 is acquired by the peak position detecting section 3.

In the next step S2, the peak position detecting section 3 analyzes whether or not there are two light intensity peak positions in the intensity distribution of incident light to the photodetecting section 10 of the image pickup device 2 based on the first and second light intensity profile data $V_1(n)$ and $V_2(m)$. Also, when detecting light intensity peak positions, it is preferable to analyze whether or not there are two light intensity peak positions each having a peak value that exceeds a predetermined threshold value. That is, it is analyzed whether or not the two headlights of the automobile exist in an image $A_0$ obtained by imaging using the image pickup device 2. Unless there are two light intensity peak positions, the routine goes back to step S1 to repeat steps S1 and S2. On the other hand, when there are two light intensity peak positions, the routine proceeds to step S3.

In step S3, based on the two light intensity peak positions $(m_0, n_1)$ and $(m_0, n_2)$ obtained by the peak position detecting section 3, the distance $\Delta n (=n_2-n_1)$ between the two positions is calculated. That is, the distance between the two headlights in the image $A_0$ obtained by imaging using the image pickup, device 2 is calculated. Then, the two light intensity peak positions $(m_0, n_1)$ and $(m_0, n_2)$ and the distance $\Delta n$ are stored.

In the next step S4, the partial image acquiring section 4 instructs the image pickup device 2 to output the image data $V_0(m,n)$. Then, the partial image acquiring section 4 analyzes the image data $V_0(m,n)$ outputted from the image pickup device 2 to extract a partial image B from the entire image $A_0$ represented by the image data $V_0(m,n)$. In this case, the partial image B is extracted so that the light intensity peak position detected by the peak position detecting section 3 is made a specific position for the partial image B. The partial image B is also magnified or demagnified so that the distance between the two light intensity peak positions is made constant. Then, the partial image B is stored in the partial image acquiring section 4.

More specifically, in step S4, the partial image B to be acquired from the entire image $A_0$ is formed in a rectangular area having four points $(m_0-p\Delta n, (n_1+n_2)/2-q\Delta n)$, $(m_0+p\Delta n, (n_1+n_2)/2-q\Delta n)$, $(m_0-p\Delta n, (n_1+n_2)/2+q\Delta n)$, and $(m_0+p\Delta n, (nln_2)/2+q\Delta n)$ in the entire image $A_0$ as vertices. That is, the partial image B has a vertical length of $2p\Delta n$ and a horizontal length of $2q\Delta n$ with the center position $(m_0, (n_1+n_2)/2)$ thereof being at the midpoint between the two light intensity peak positions (i.e. two headlight positions). The values of "p" and "q" will be set appropriately so that the license plate exists in the partial area B. When the partial image B is magnified or demagnified with a coefficient proportional to the value of $\Delta n$, the size of the partial image B is made constant thereafter, so that the two light intensity peak positions are made constant and the distance between the two light intensity peak positions is made constant in the partial image B. It is noted that there may or may not be a light intensity peak position (i.e. headlight position) in the partial image B.

In the next step S5, the same processing as in step S1 is performed. In the further next step S6, approximately the same processing as in step S2 is also performed. In step S6, when there are two light intensity peak positions, the routine goes back to step S3. On the other hand, unless there are two light intensity peak positions, the routine proceeds to step S7.

In step S7, the partial image operating section 5 adds all the partial images 13 stored so far to display an integrated image obtained as a result of the addition on a display section. Also, the integrated image is analyzed to determine the display area of the license plate and further to recognize the displayed content of the license plate. After the foregoing processing is completed, the routine performs processing again from step S1.

As described heretofore, in accordance with the image pickup system and image pickup method according to the present first embodiment, the peak position detecting section 3 and partial image acquiring section 4 specify a partial image including a subject, and then the partial image operating section 5 integrates the partial image to image the subject. It is therefore possible to image the subject (license plate in the foregoing example) even when the subject may be dark. In addition, the image pickup system 1 according to the first embodiment requires no special illumination device for image pickup such as flashlight to be provided therein, which makes it possible to achieve a low power consumption as well as a low cost.

Second Embodiment

Figure 8:
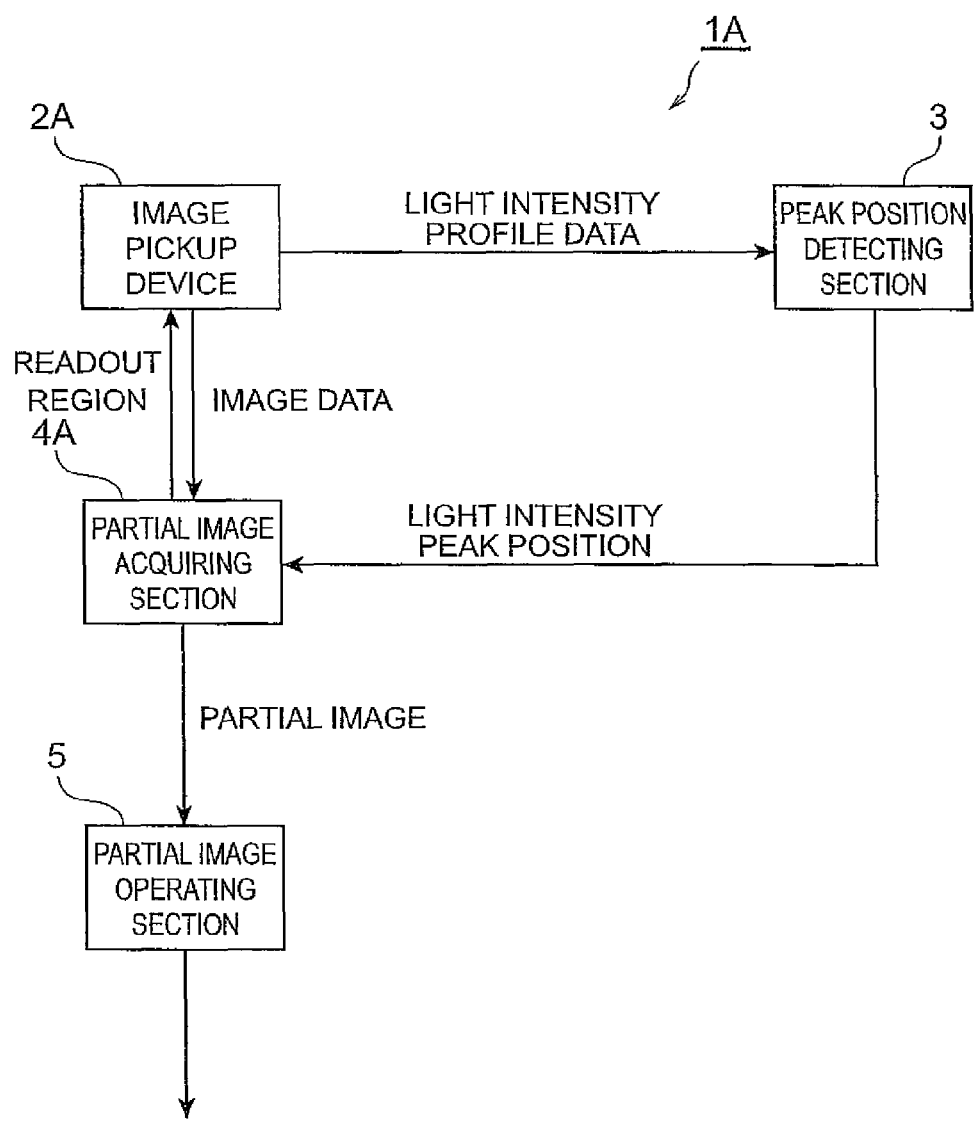
FIG. 8 is a view showing the schematic configuration of an image pickup system of a second embodiment according to the present invention.

Next, an image pickup system and an image pickup method of a second embodiment according to the present invention will be explained. FIG. 8 is a view showing the schematic configuration of the image pickup system of the second embodiment according to the present invention. The image pickup system 1A shown in FIG. 8 comprises an image pickup device 2A, a peak position detecting section 3, a partial image acquiring section 4A, and a partial image operating section 5. Each of the peak position detecting section 3 and partial image operating section 5 in the second embodiment has the same structure as and operates in the same manner as each corresponding section in the above-described first embodiment.

The image pickup device 2A according to the second embodiment is different from the image pickup device 2 according to the first embodiment in that each pixel has data storing capacitance for storing an output from the photodiode 61.

The partial image acquiring section 4A according to the second embodiment acquires a partial image from an entire image that can be imaged by the image pickup device 2A so that the light intensity peak position detected by the peak position detecting section 3 is made a specific position for the partial image in the entire image. In particular, in the second embodiment, when acquiring the partial image, the partial image acquiring section 4A reads out only image data corresponding to the partial image from the image pickup device 2A.

That is, in the second embodiment, the partial image acquiring section 4A decides the range of a partial image to be acquired from an entire image that can be imaged by the image pickup device 2A based on the light intensity peak position detected by the peak position detecting section 3. Then, the partial image acquiring section 4A instructs the image pickup device 2A to output only image data $V_0(m,n)$ corresponding to the partial image. The thus instructed image pickup device 2A outputs only image data $V_0(m,n)$ corresponding to the indicated partial image. In this case, the shift registers 20A and 20B of the image pickup device 2A as shown in FIG. 3 specify only pixels in the partial image to output image data $V_0(m,n)$. For example, each of the shift registers 20A and 20B may has a random access function. It may also be arranged that the shift register 20A sets only signal "shift $(HI_n)$" that corresponds to the range from the readout initiated column to the readout terminated column sequentially at a high level, and that the shift register 20B sets only signal "shift $(VI_m)$" that corresponds to the range from the readout initiated row to the readout terminated row sequentially at a high level.

Also, in the second embodiment, the time period during which the partial image acquiring section 4A acquires the partial image from the image pickup device 2A and the time period during which the peak position detecting section 3 acquires the light intensity profile data from the image pickup device 2A are preferably overlapped at least partially with each other. That is, the image pickup device 2A preferably outputs the first and second light intensity profile data $V_1(n)$ and $V_2(m)$ while outputting the image data $V_0(m,n)$ corresponding to the partial image that is decided by the partial image acquiring section 4A based on the light intensity peak position detected by the peak position detecting section 3.

Figure 9:
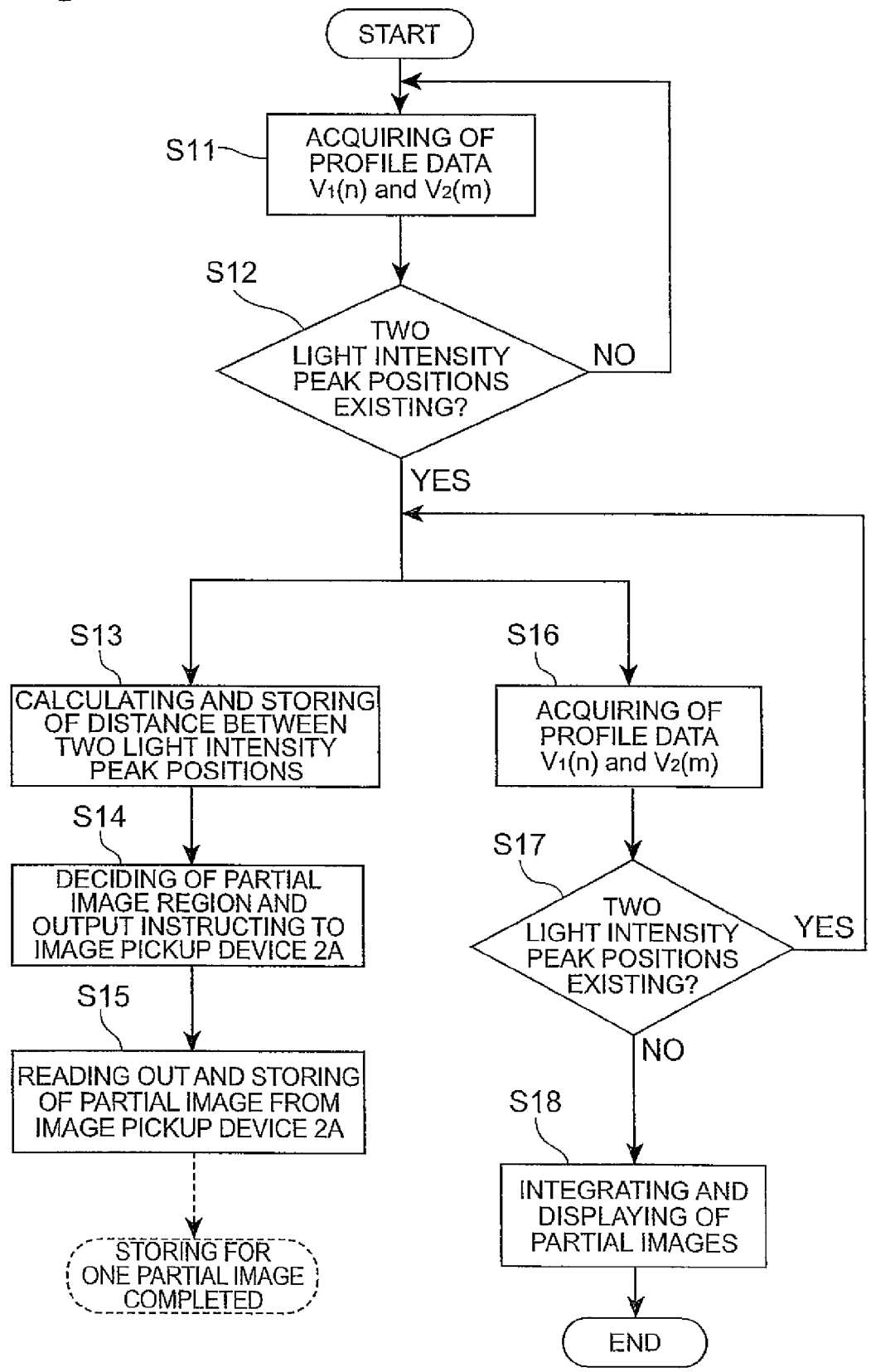
FIG. 9 is a flow chart for explaining the operation of the image pickup system according to the second embodiment.

Next, the operation of the image pickup system 1A and the image pickup method according to the second embodiment will be explained. FIG. 9 is a flow chart for explaining the operation of the image pickup system 1A according to the second embodiment. As is the case with the first embodiment, the second embodiment will also explain the case of imaging a license plate of an automobile moving at night.

In step S11, the peak position detecting section 3 instructs the image pickup device 2A to output first and second light intensity profile data $V_1(n)$ and $V_2(m)$. Then, the first and second light intensity profile data $V_1(n)$ and $V_2(m)$ outputted from the image pickup device 2A is acquired by the peak position detecting section 3.

In the next step S12, the peak position detecting section 3 analyzes whether or not there are two light intensity peak positions in the intensity distribution of light incident on the photodetecting section 10 of the image pickup device 2A, based on the first and second light intensity profile data $V_1(n)$ and $V_2(m)$. Also, when detecting light intensity peak positions, it is preferable to analyze whether or not there are two light intensity peak positions each having a peak value that exceeds a predetermined threshold value. That is, it is analyzed whether or not the two headlights of the automobile exist in an image $A_0$ obtained by imaging using the image pickup device 2A. Unless there are two light intensity peak positions, the routine goes back to step S11 to repeat steps S11 and S12. On the other hand, when there are two light intensity peak positions, the routine proceeds to step S13.

After step S12, the processing of steps S13 to S15 and the processing of steps S16 and S17 will be performed in parallel.

In step S13, based on the two light intensity peak positions $(m_0, n_1)$ and $(m_0, n_2)$ obtained by the peak position detecting section 3, the distance $\Delta n$ $(=n_2-n_1)$ between the two positions is calculated. That is, the distance between the two headlights in the image $A_0$ obtained by imaging using the image pickup device 2A is calculated. Then, the two light intensity peak positions $(m_0, n_1)$ and $(m_0, n_2)$ and the distance $\Delta n$ are stored.

In step S14, the partial image acquiring section 4A decides the range of a partial image to be acquired from an entire image that can be imaged by the image pickup device 2A based on the two light intensity peak positions $(m_0, n_1)$ and $(m_0, n_2)$. Then, the image pickup device 2A is instructed to output only image data $V_0(m,n)$ corresponding to the partial image.

More specifically, in step S14, the partial image B to be acquired from the entire image $A_0$ is formed in a rectangular area having four points $(m_0-p\Delta n, (n_1+n_2)/2-q\Delta n)$, $(m_0+p\Delta n, (n_1+n_2)/2-q\Delta n)$, $(m_0-p\Delta n, (n_1+n_2)/2+q\Delta n)$, and $(m_0+p\Delta n, (n_1+n_2)/2+q\Delta n)$ in the entire image $A_0$ as vertices. That is, the partial image B has a vertical length of $2p\Delta n$ and a horizontal length of $2q\Delta n$ with the center position $(m_0, (n_1+n_2)/2)$ thereof being at the midpoint between the two light intensity peak positions (i.e. two headlight positions). The values of "p" and "q" will be set appropriately so that the license plate exists the partial area B. The image pickup device 2A is instructed to output only image data $V_0(m,n)$ corresponding to the partial image that is represented by the rectangular area.

In the next step S15, only image data $V_0(m,n)$ corresponding to the partial image is outputted from the image pickup device 2A and is acquired by the partial image acquiring section 4A. Further, the partial image acquired by the partial image acquiring section 4A is magnified or demagnified so that the distance between the two light intensity peak positions is made constant. Then, the partial image is stored in the partial image acquiring section 4A to complete the branch processing for partial image readout.

The processing of steps S16 and S17 is performed in parallel with the processing of steps S13 to S15. In step S16, the same processing as in step S11 is performed. Then, in the following step S17, approximately the same processing as in step S12 is performed based on the processing result of step S16. In step S17, if there are two light intensity peak positions, the routine goes back to the subsequent stage of step S12 to perform the processing of steps S16 and S17 in parallel with the processing of steps S13 to S15. On the other hand, unless there are two light intensity peak positions, the routine proceeds to step S18.

In step S18, the partial image operating section 5 adds all the partial images B stored so far to display an integrated image obtained as a result of the addition on a display section. Also, the integrated image is analyzed to determine the display area of the license plate and further to recognize the displayed content of the license plate. After the foregoing processing is completed, the routine performs processing again from step S11.

As described above, the image pickup system and image pickup method according to the second embodiment can exhibit the same effect as the above-described first embodiment. Additionally, in accordance with the image pickup system and image pickup method according to the second embodiment, since only a necessary partial image is read out from the image pickup device 2A, the number of times partial images can be read out from the image pickup device 2A per unit time is increased. Also, partial images are acquired from the image pickup device 2A through data storing capacitance provided in each pixel. This allows partial image acquisition and light intensity profile data acquisition from the image pickup device 2A to be performed in parallel with each other. Also in this respect, the number of times partial images can be read out from the image pickup device 2A per unit time is increased. That is, it is possible to read out partial images at a frequency where a subject can only move a little between a certain partial image and the next partial image. Therefore, in the present second embodiment, since more partial images can be integrated, the subject can be imaged more clearly.

Modified Example

The present invention is not restricted to the above-described first and second embodiments, and various modifications may be made. For example, the partial image B acquired from the entire image $A_0$ and magnified or demagnified may be added cumulatively to partial images that have already been stored. Also, the partial image B acquired from the entire image $A_0$ may be stored together with the distance $\Delta n$, and afterward magnified or demagnified partial images B may be integrated collectively. Further, each entire image $A_0$ may be stored, and afterward partial images B may be extracted, magnified/demagnified, and integrated collectively.

Further, although the foregoing descriptions of the operation assume an automobile, which cannot be rotated, as a subject, in the case of a rotational subject, the partial image is to be rotated based on a plurality of light intensity peak positions detected by the peak position detecting section. Then, the partial image operating section magnifies or demagnifies the partial image so that the distance between the two light intensity peak positions is made constant, and then integrates the thus magnified or demagnified partial image.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

Although the image pickup system and image pickup method according to the present invention can be applied representatively to a system for detecting an automobile license number at night, it is also possible to detect the shape of waterborne microorganisms by marking a fluorescent substance on the microorganisms and acquiring integrated images from the positional information of the fluorescent substance, which also allows broad application for inspection systems in various fields of science and technology such as biotechnology.

The invention claimed is:
1. An image pickup system comprising:
   an image pickup device having a photodetecting section with a plurality of pixels arranged two-dimensionally therein, said image pickup device outputting image data that represents the two-dimensional intensity distribution of light incident on said photodetecting section, and outputting light intensity profile data that represents the one-dimensional intensity distribution of the incident light in each of a first direction and a second direction different from the first direction in said photodetecting section;

a peak position detecting section acquiring the light intensity profile data in the respective first and second directions outputted from said image pickup device and detecting a light intensity peak position in the two-dimensional intensity distribution of the light incident on said photodetecting section in said image pickup device based on the acquired light intensity profile data;

a partial image acquiring section acquiring a partial image from an entire image that can be imaged by the image pickup device so that the light intensity peak position detected by said peak position detecting section is made a specific position for the partial image in the entire image; and a partial image operating section integrating the partial image acquired by said partial image acquiring section.

2. An image pickup system according to claim 1, wherein said peak position detecting section detects a plurality of light intensity peak positions in the two-dimensional intensity distribution of the light incident on said photodetecting section in said image pickup device, and wherein said partial image operating section magnifies or demagnifies the partial image so that the distance between the plurality of light intensity peak positions is made constant, and thereafter integrates the magnified or demagnified partial image.

3. An image pickup system according to claim 1, wherein said peak position detecting section detects a plurality of light intensity peak positions in the two-dimensional intensity distribution of the light incident on said photodetecting section in said image pickup device, and wherein said partial image operating section rotates the partial image so that the direction of straight lines connecting the plurality of light intensity peak positions with each other is made constant, and thereafter integrates the rotated partial image.

4. An image pickup system according to claim 1, wherein said partial image acquiring section extracts only image data corresponding to the partial image among the image data read out from said image pickup device.

5. An image pickup system according to claim 1, wherein said partial image acquiring section reads out only image data corresponding to the partial image from said image pickup device.

6. An image pickup system according to claim 5, wherein the time period during which said partial image acquiring section acquires the partial image from said image pickup device and the time period during which said peak position detecting section acquires the light intensity profile data from said image pickup device are overlapped at least partially with each other.

7. An image pickup method using an image pickup device having a photodetecting section with a plurality of pixels arranged two-dimensionally therein, said image pickup device outputting image data representing the two-dimensional intensity distribution of light incident on the photodetecting section and outputting light intensity profile data representing the one-dimensional intensity distribution of the incident light in each of a first direction and a second direction different from the first direction in said photodetecting section, said method comprising:

a peak position detecting step of acquiring the light intensity profile data in the respective first and second directions outputted from said image pickup device, and of detecting a light intensity peak position in the two-dimensional intensity distribution of the light incident on said photodetecting section in said image pickup device based on the acquired light intensity profile data;

a partial image acquiring step of acquiring a partial image from an entire image that can be imaged by said image pickup device so that the light intensity peak position detected in the peak position detecting step is made a specific position for the partial image in the entire image; and a partial image operating step of integrating the partial image acquired in the partial image acquiring step.

8. An image pickup method according to claim 7, wherein the peak position detecting step detects a plurality of light intensity peak positions in the two-dimensional intensity distribution of the light incident on said photodetecting section in said image pickup device, and wherein the partial image operating step magnifies or demagnifies the partial image so that the distance between the plurality of light intensity peak positions is made constant, and integrates the magnified or demagnified partial image.

9. An image pickup method according to claim 7, wherein the peak position detecting step detects a plurality of light intensity peak positions in the two-dimensional intensity distribution of the light incident on said photodetecting section in said image pickup device, and wherein the partial image operating step rotates the partial image so that the direction of straight lines connecting the plurality of light intensity peak positions with each other is made constant, and integrates the rotated partial image.

10. An image pickup method according to claim 7, wherein the partial image acquiring step extracts only image data corresponding to the partial image among the image data read out from said image pickup device.

11. An image pickup method according to claim 7, wherein the partial image acquiring step reads out only image data corresponding to the partial image from said image pickup device.

12. An image pickup method according to claim 11, wherein the time period for acquiring the partial image from said image pickup device in the partial image acquiring step and the time period for acquiring the light intensity profile data from said image pickup device in the peak position detecting step are overlapped at least partially with each other.

* * * * *